Oct. 8, 1940.   O. SEVERSON   2,216,788
TAPERED SERRATED WEDGE LOCK
Filed Dec. 16, 1931
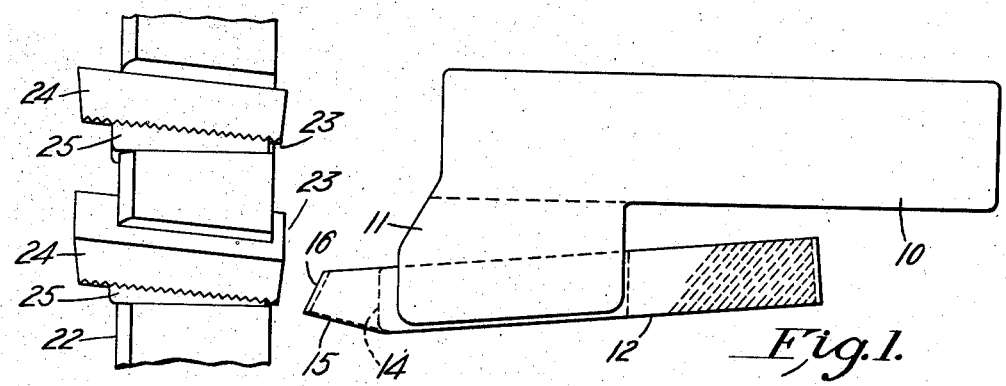
Fig. 1.
Fig. 6.
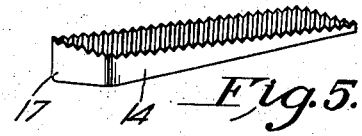
Fig. 5.
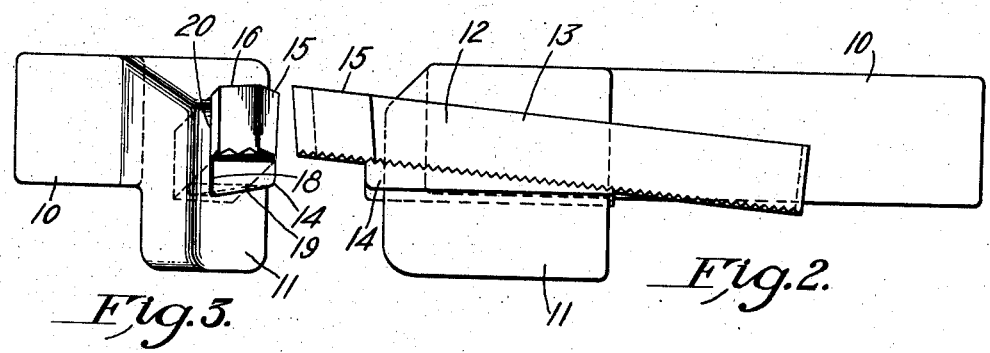
Fig. 3.   Fig. 2.
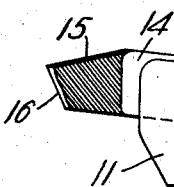
Fig. 4.
INVENTOR-
Ole Severson
BY
Nathan, Bowman & Helfrich
ATTORNEYS Patented Oct. 8, 1940

2,216,788

UNITED STATES PATENT OFFICE 2,216,788

TAPERED SERRATED WEDGE LOCK

Ole Severson, Shelton, Conn., assignor to The O. K. Tool Company, Inc., New York, N. Y., a corporation of New York Application December 16, 1931, Serial No. 581,397

5 Claims. (Cl. 29—96)

This invention is directed to improvements in cutter tools of the inserted blade type. Cutters of this type, in which worn blades may be replaced, have become a most important factor in the achievement of efficient, economical working of metal. In addition to prolonging the life of the cutter their use enables the supporting body to be made of a suitable material having great toughness and strength but at the same time amenable to machining operations to produce the desired, and sometimes intricate, shapes for the support of the cutter blades; whereas, the cutter blades may be formed from one of the special alloys which have been developed and which possesses properties rendering them peculiarly adapted to cope with the hard or tough metals to be machined and the high temperatures to which they are frequently subjected.

The resort to inserted blade cutters has, however, introduced difficult problems, prominent among which is that of securing a sufficiently rigid tool. Such problem has been greatly enhanced by the development of more powerful machines resulting from the application of hydraulic propulsion and/or other improvements therein. The cutter tool has been, in fact, and no doubt will continue to be, the crucial and limiting factor in determining the capacity of machine tools and the quality of the work produced.

It was conceived, a considerable time past, in the development of inserted blade cutters, that ultimate tool costs and delays in production work could be diminished to an even greater extent if the blades were made, not only replaceable, but that they be made individually adjustable to prolong their life.

In view of the highly important role imposed upon the cutter tool many engineers have been actively engaged in this art and a great variety of inserted blade cutter tool constructions have been proposed, some of which have proved practical and been extensively employed, though in many cases not with entire satisfaction.

The present invention proposes an arrangement, simple in construction, but very effective in coping with these conditions encountered in the attempt to achieve an entirely satisfactory and practical inserted blade cutter, particularly of the type in which the blade is adjustable to compensate for wear and re-grindings. The blade unit consists of two parts—a blade proper and a locking wedge member—so related to each other as to form, in effect, a single member or unit. The ultimate adjusted position to be assumed by the blade, when in the cutter body, is determined by the relative position that the members are given prior to insertion in the cutter body, the compound blade thereafter functioning, as stated, as a single unit and possessing all the rigidity and freedom from displacement of a single piece blade. The general outer contour of the compound blade, and, therefore, of the blade opening, is of simple geometric form capable of being readily machined and of being accurately produced, both as to the blade unit and as to the cutter body opening.

All of the contacting surfaces are relatively extensive in area and well able to support the cutter blades against the exceedingly high forces to which they are subjected. The arrangement is such as to enable the blade units to be quickly and easily removed and replaced or adjusted as the case may be. The cutter blade proper, i. e., the ultimate member which performs the cutting operation, is of very simple shape and easily produced, the more intricate shapes, if the construction can be said to have any such, being imposed on the locking wedge member which is not subjected to any wear.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which:

Figure 1 shows the invention incorporated in a shank or blade tool, this being a plan view thereof. Fig. 2 is a side elevational view corresponding to Figure 1. Fig. 3 is an end elevational view. Fig. 4 is a bottom plan view. Fig. 5 shows the wedge locking member disassociated from the other elements; and Fig. 6 is a fragmentary view showing the invention incorporated in a typical multi-bladed rotary cutter.

The specific type of cutter tool, to which the invention is shown applied in Figures 1 to 5, is a somewhat conventional lathe or shank type tool including a main supporting body member or shank designated 10 having an offset depending portion 11 in which the compound cutter blade, indicated as a whole by the reference character 12, is mounted. The cutter blade unit comprises two members, the cutter bit 13 and the wedge locking member 14. The cutter bit member 13 is, as shown, of uniform cross-section throughout its length, except for the outer end having the cutting edges 15 and 16. The wedge member 14, however, is tapered in two general directions, i. e., longitudinally and transversely, being thickest at its outer end 17 and on its inner side 18, the sides of the wedge diverging inwardly in the transverse direction to form a dove-tail. The blade opening in the cutter tool supporting shank is shaped in accordance with the combined form of the members 13 and 14. The net result of the relation of the parts and of the shapes of the retaining walls is to cause the cutting forces imposed on the cutting blade to more securely wedge the blade and its locking member in the cutter body. In this respect it is to be noted that the bottom wall 19 of the opening for the cutter blade unit slopes downwardly to the left in Figure 3, whereby cutting forces imposed on the blade tend to force the parts firmly against the inner wall 20.

Interlocking formations between the two members 13 and 14, forming the blade unit, are provided, comprised, as here specifically illustrated, of serrations on the top surface of the wedge member 14 and on the bottom surface of the cutter bit 13. Such means permits selective positioning of the cutter bit 13 in the shank and, once the two parts are inserted as a unit therein, firmly locks the two members 13 and 14 together in the cutter body. Since the cutter bit member 13 is of uniform cross-section, wedging action will take place, and the wedge member 14 will always occupy a position substantially as shown in the drawing, irrespective of the position of the cutter bit 13. In the shank tool shown it will be observed that the offset portion 11 enables a cutter bit 13, of practically any length, to be employed. As an aid in making the tool self-locking under cutting forces, it will be observed that the serrations extend substantially in the direction of the resultant force imposed on the cutter bit when in engagement and operating on the metal work-piece to be machined.

The invention, it will be understood, is applicable in either tools of the single bladed shank type or in multi-bladed cutter tools which are normally those of the rotary type. A typical and simple form of rotary tool is fragmentarily illustrated in Figure 6 and comprises a body portion 22 having a series of blade openings therein in which are mounted similar blade units 23, each consisting of a cutter bit 24 and its cooperating locking wedge member 25. The functioning of the various parts is substantially the same as in connection with the shank tool just described in detail and further description of the rotary cutter is deemed unnecessary.

It will be apparent that an inserted blade cutter of the construction typified by the foregoing described specific form possesses many advantages, among which may be noted the ease and convenience of manufacture and accuracy in the fit of the parts in the assembled cutter resulting in an inserted blade cutter possessing the rigidity practically of a solid cutter having its blades integral therewith.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:

1. A compound insertable cutter blade unit comprising an elongated cutter bit proper having cutting edges formed upon the forward end thereof and a cooperating elongated wedge member tapered both longitudinally and transversely, said members conjointly forming a diagonally tapered blade unit adapted to be removably inserted in a correspondingly shaped opening in a cutter body, said opening having an upper and inner wall perpendicularly arranged and a lower wall inclined inwardly and forwardly with repect to said top wall, interlocking means between the respective adjacent surfaces of said members comprising a series of interfitting parallel serrations extending from the outer side thereof inwardly and rearwardly crosswise and at an acute angle to the longitudinal axis of the unit for selectively locating said members with respect to each other and for locking said members together causing said two members when said unit is inserted in a holder and subjected to tooling forces to move as a single unit into tighter wedging condition between the upper and lower walls of the opening in the holder and causing said blade member proper to move laterally inwardly more firmly to engage the inner side wall of the opening.

2. A compound insertable cutter blade comprising a cutter bit member substantially rectangular in cross-section, and a cooperating wedge member, said wedge member being tapered both longitudinally and laterally and forming conjointly with said cutter bit member a unit adapted to be removably inserted in a correspondingly shaped opening in a cutter body, said opening having an upper and inner wall perpendicularly arranged and a lower wall inclined inwardly and forwardly with respect to said top wall, the wider side of said unit engaging the inner wall of the opening and the larger end of the unit disposed toward the cutting end of the bit, and serrations on the respective adjoining surfaces of said members extending at an angle of substantially 45° to the longitudinal axis of the bit proper with the outer ends of the serrations disposed forwardly of the inner ends whereby said cutter bit member may be selectively positioned and locked with respect to said wedge member and thereby with respect to the upper and lower walls of the opening in the cutter body and whereby the reactionary pressure of cutting forces tend to urge said members as a unit into tighter wedging condition between the said upper and lower walls of the opening in the cutter body and said blade proper laterally into firm engagement with said inner side wall of the opening.

3. A cutter tool combining a supporting body having an offset head portion and an open sided cutter blade opening formed in the offset head portion; and a compound cutter blade unit adapted to be secured in said opening comprising an elongated square cutter bit member and a wedge member, said wedge member being tapered both longitudinally and transversely with the sides diverging inwardly in said transverse direction, the upper and lower walls of said opening being shaped to conform to the combined blade unit, and tongue and groove interlocking means between the adjoining surfaces of said members extending from the outer side of said members inwardly and rearwardly at an acute angle to the longitudinal axis of the blade unit for selectively positioning said cutter bit member with respect to said wedge member and thereby said supporting body, said means comprising a series of grooves on one of said members and a rib on the other operative to cause said members to move as a unit in the direction of clamping and said blade member proper laterally inwardly in said opening under the reactionary pressures of the cutting forces acting upon the end of said bit 4. A single point lathe tool combining an elongated holder member having a shank portion and a head portion offset from the shank, said head portion having a three-sided opening formed therein extending through the head portion in the general direction of the length of the holder, the top and inner side walls of said opening being perpendicularly arranged with respect to each other and the bottom wall of the opening being inclined, with respect to the top wall toward the forward end of the head portion and downwardly inwardly toward said inner side wall; an elongated square bit member proper adapted to be inserted in the said opening substantially parallel to the longitudinal axis of the holder with the ends thereof projecting beyond the extremities of the offset head portion, said bit member being provided with a cutting edge only at the end of the forward projecting portion; a wedge member adapted to be fitted into said opening between the underside of said bit and said bottom wall of the opening; and interengaging means locking said bit and wedge member together so that pressures incident to a tooling operation acting upon the end of the bit tend to move the bit and wedge as a unit rearwardly into tighter wedging condition between said upper and lower walls of the opening, and said bit member proper laterally inwardly more firmly to engage the inner side wall of said opening.

5. A cutter tool combining a supporting body having a cutter bit slot therein with forward and lateral openings for the reception of removable cutter bit means; and a compound cutter bit unit mounted in said slot with means for selectively positioning the cutter bit and securing it in adjusted position therein, said unit comprising a member of high grade cutting material having cutting edges at the outer end and being of substantially uniform cross section, a complemental wedge member tapered longitudinally to form a wedge in the direction of cutting forces and being tapered transversely with the sides diverging inwardly in said lateral direction to form a dove-tail means, said supporting body slot being shaped to correspond with that of the combined cutter bit unit, and complemental serrations on the adjoining surfaces of said members extending rearwardly and inwardly at an acute angle to both said longitudinal direction and to said lateral direction, said serrations permitting selective adjustment of said cutter bit member and co-acting with said tapers under cutting forces to wedge securely in place said members as a unit with said cutter bit member in the selected position.

OLE SEVERSON.